Patented July 4, 1933

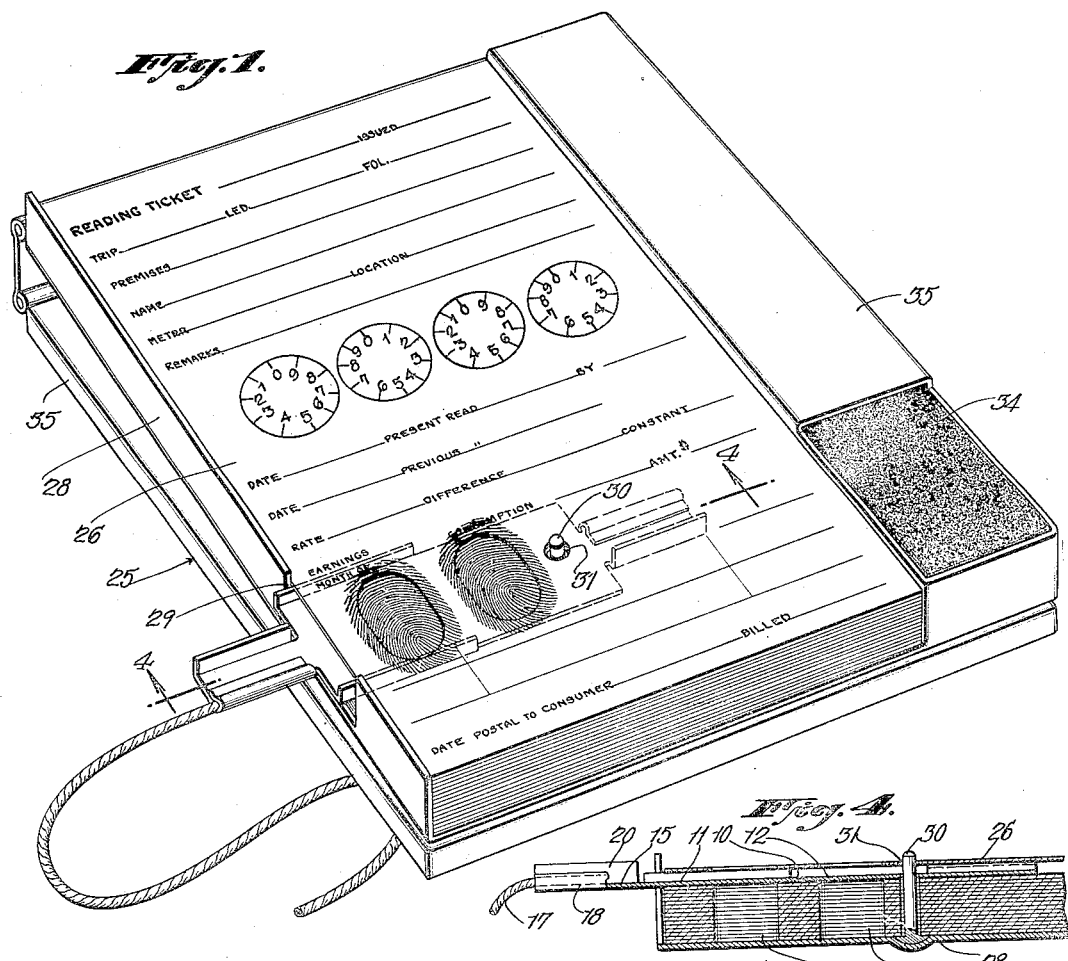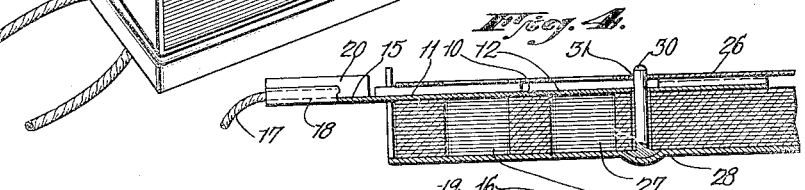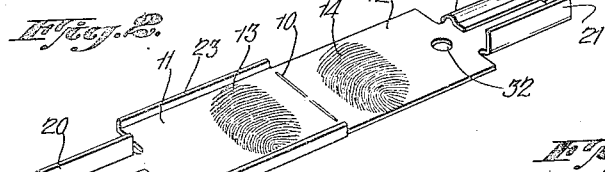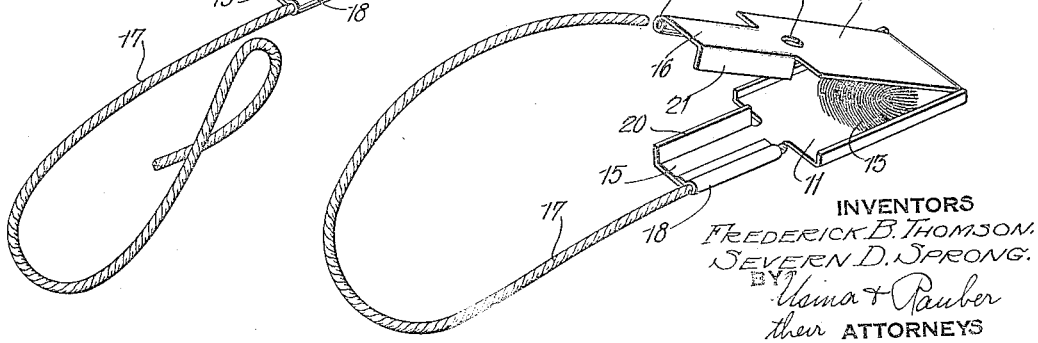

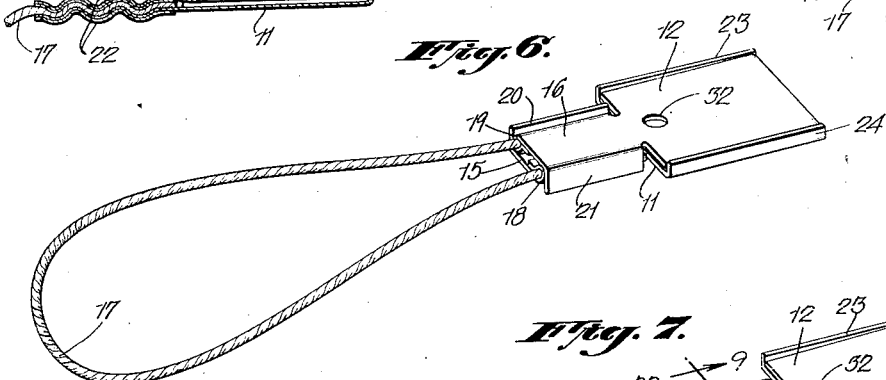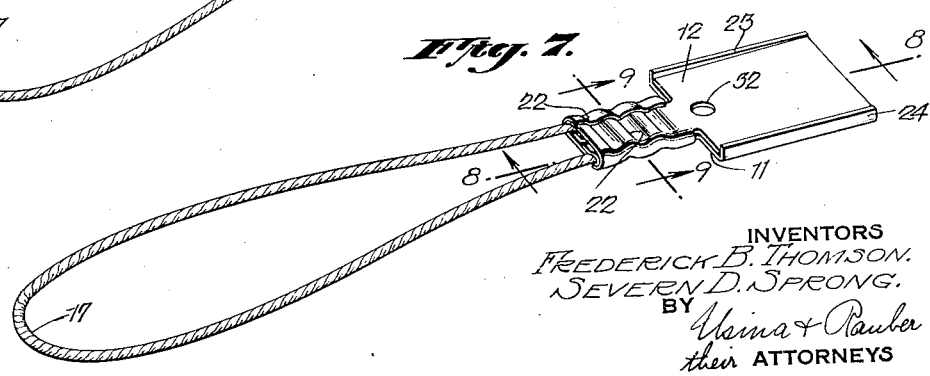

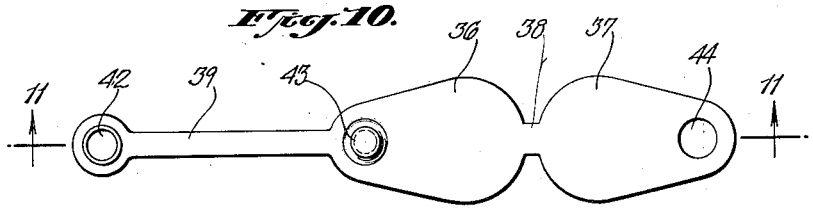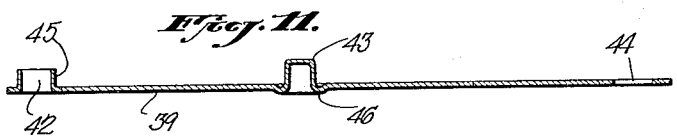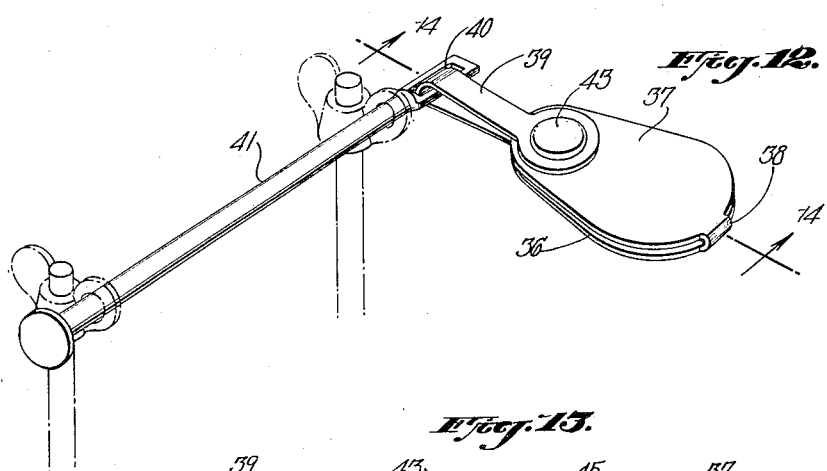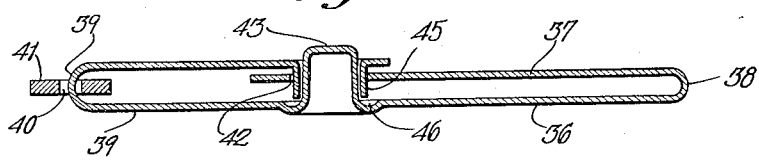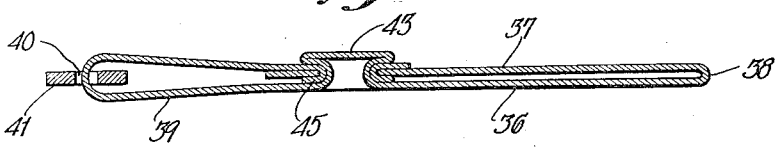

1,916,448

UNITED STATES PATENT OFFICE

FREDERICK B. THOMSON, OF TEANECK, NEW JERSEY, AND SEVERN D. SPRONG, OF BROOKLYN, NEW YORK, ASSIGNORS TO ENGINEERING PRODUCTS CORPORATION, INC., OF NEW YORK, N. Y., A CORPORATION OF NEW YORK

METER TAG IDENTIFICATION SEAL

Application filed June 23, 1932. Serial No. 618,868.

Our invention relates to meter seals and more particularly to seals for electric and other public utilities meters on which charges to consumers are based.

Inasmuch as the charges to consumers are based on the meter readings, any change in the meter which will retard it or otherwise cause it to read low will correspondingly lower these charges. Retarding or slowing down of electric meters is a comparatively simple matter once the interior of the meter box or meter is opened sufficiently to give access to the connecting wires so that certain connections may be loosened or by-passed. Once these connections at, or leading to, the meter have been tampered with and the box closed and replaced to its original condition, it is almost impossible to prove with the necessary certainty that the consumer has tampered with the meter and that the connections at fault were not improperly or carelessly installed by the utility company.

To guard against meter tampering and theft of current, seals have been provided with the object of preventing the opening of the meter box or of turning or moving the closure securing means without breaking or destroying the seal so that it can not be replaced in sealing position or, if replaced, will bear visible and unmistakable evidence of having been broken. However, as these seals must be made in large quantities and, consequently, to substantially the same pattern, it is difficult, if not impossible, to insure against duplication of the seals and therefore to prevent replacement of a seal broken in tampering with a new and false seal but one so indistinguishable from the original that its replacement can not be proven with the required certainty.

An object of our invention is to provide a meter seal that can not be opened without being irreparably broken and on which are provided individual and non-reproducible identifying marks.

Further to prevent possibility of replacing the seal and to make an indisputable record of the time of sealing and to identify the sealer, the invention provides a means and a method whereby the marking of the seal is a separated or broken part of a larger mark the other part of which is carried on a dated record sheet separate from the seal and retained by the utility company so that the whole mark can be reconstituted only by the original seal and the record sheet.

With these and other objects in view, which will more fully appear in the following description, the invention comprises the methods and devices described in the following specification and claims.

The various features of the invention are illustrated in the accompanying drawings, in which—

Fig. 1 is a perspective view of an open seal embodying my invention, in position in a record sheet and marked with a mark common to said record sheet;

Figs. 2 and 3 are perspective views of the seal in open and closing positions, respectively;

Fig. 4 is a sectional view of the seal and a pad of record sheets embodying my invention taken on line 4—4 of Fig. 1;

Fig. 5 is a plan view of an inspection record sheet embodying my invention;

Fig. 6 is a perspective view of the seal in closed position;

Fig. 7 is a similar view of the closed seal and with the parts receiving the ends of a sealing cord tightly crimped thereon;

Figs. 8 and 9 are sectional views of the crimped portion of the seal taken on lines 8—8 and 9—9, respectively, of Fig. 7;

Figs. 10 and 11 are respectively a plan view and a section, on line 11—11 of Fig. 10, of a modification of the invention;

Fig. 12 is a perspective view of the modification shown in Figs. 10 and 11 showing the seal mounted in position;

Figs. 13 and 14 are longitudinal sections of the seal on line 14—14 of Fig. 12, showing the seal before and after it is locked.

As illustrated in the accompanying drawings, the seal of the present invention comprises a sheet of suitable metal, such as zinc, divided by a transverse groove 10 into a pair of complementary plane portions 11 and 12 on which the markings 13 and 14 may be received. Extending from the free ends of the plane areas 11 and 12 are loop securing extensions 15 and 16, respectively, in one of which, 15 for example, an end of a loop 17 of metal, fibrous or other material is secured in any suitable manner, as for example, by turning over one edge of the extension as at 18 about the end portion of the loop and tightly compressing it on the latter. In sealing a meter, the free end of the loop 17 is passed through the parts of the meter to be sealed, such as the securing lugs, studs or nuts and is then inserted into a recess 19 formed by a turned over edge of the extension 16.

The groove or cut 10 forms a bending line about which the portions 11 and 12 may be bent from the position shown in Fig. 2 to those shown in Figs. 3 and 6. The free end of the loop 17 may be inserted into the recess 19 in any of these positions after having been inserted through the meter box parts to be held closed. When folded flat to the position of Fig. 6, the extensions 15 and 16 are in superposed position and enclose the ends of the loop 17 and the recesses 18 and 19. The extensions 15 and 16 are provided on the edges opposite the recesses 18 and 19, respectively, with upstanding flages 20 and 21, which therefore lie along the outer edges of the recesses 19 and 18 of the opposite extension.

In sealing the ends of the loops in the seal, the flanges 20 and 21 are further turned about the recesses 19 and 18, respectively, as shown in Figs. 7 and 9 and are crimped in transverse crimpings 22 as indicated in Figs. 7 and 8. In this manner, the ends of the loop 17 are so tightly secured that they can not be withdrawn as long as the extensions 15 and 16 are secured in place. It will be understood that the specific form of embodiment of the invention shown in the above drawings is illustrative and that other forms and arrangements of the various elements may be made.

To withdraw and reinsert one of the ends of the loop 17 in the seal or tag, it is necessary to open or separate the extensions 15 and 16 and to replace them. The cut 10 and the characteristics of the metal are so related, however, that but one bending of the plate on the cut 10 is possible without breaking and, therefore, when the plates are bent reversely on the cut 10, the plate cracks on the line 10 and the integrity of the seal is irreparably and visibly destroyed. If replaced by an unauthorized seal, the latter will lack the marks 13 and 14 which are merely partial thumb prints of the inspector that sealed the meter. To prevent smudging of these marks in the original seal the portions 11 and 12 are separated slightly by a shallow upturning of the edges of one portion 11, for example as at 23 and 24. Unofficial reproduction of the markings 13 and 14 by the inspector himself is prevented also by our invention and the date of the last official sealing and marking is positively recorded.

For this purpose, the inspector or sealer of the meter equipment is supplied with a number of unmarked seals and also with a pad 25, of Fig. 1 of blank paper forms 26, each of which is provided with blanks for such data as the customer's name, the date, as may be required by the company. In one space of the form is punched a hole or preferably a pair of holes 27, of the general shape of a thumb, or finger print but slightly smaller so that when the seal portions 11 and 12 are placed beneath the holes 27 and an inked thumb or finger pressed on the holes, the central part of the resulting print will be received on the respective portion 11 or 12 and the outer parts of the print on the part of the form surrounding the hole. To identify the seal afterward, it is only necessary to select the proper filled form and place the thumb or finger prints under the openings 27. If it is the original seal, the thumb prints will match. If they do not match, it is proof that the original seal has been removed.

For convenience, the pad 25 is provided with a holder 28 having retaining edge walls, one of which is provided with a slot 29 of the width of a seal or tag and so positioned that when a tag or seal is extended therethrough the portions 11 and 12 will underlie the openings 27 of a form. The holder also carries a positioning post 30 extending upwardly from its base through appropriately positioned holes 31 in the forms 26 and adapted to extend through a hole 32 in the seal when the latter is in approximately proper position to receive a marking.

The pad holder is also provided with an inking pad 33 at one side of the forms pad and with a spreading plate 34. It may also be provided with a cover 35, preferably a double hinge cover.

In the modification shown in Figs. 10 to 14 inclusive, the seal is formed of sheet metal having portions 36 and 37 corresponding respectively to the portions 11 and 12 of Fig. 2 and joined by a narrow neck portion 38. A narrow strip of metal 39 extending from the portion 36 forms the loop portion corresponding to the loop 17 of Fig. 2. This loop element 39 is adapted to slip through the loop 40 of the locking bar 41, as indicated in Fig. 12 and is then bent double to bring an opening 42 at its free end above a stud 43 pressed upwardly from the portion 36 and thus to form a closed loop that will prevent the removal of the bar 41.

Before the loop member 39 is thus formed into a loop, the areas 36 and 37 will have been marked with thumb marks as was the case in the modification illustrated in Fig. 2. The portions 36 and 37 are then folded together through the neck portion 38, as shown in Figs. 12 and 13 bringing an opening 44 over the stud 43 so that when the loop member 39 is folded into a loop an annular flange 45 encircling the opening 42 will enter the opening 44 as shown in Figs. 13 and 14. When the parts have been folded to the position shown in Fig. 13, the end of the loop member 39 is compressed downwardly to cause the annular flange 45 to be curved upwardly by an annular recess 46 at the base of the stud 43 and thus to enclose the opening 44 in the manner of an eyelet, thereupon the stud 43 is compressed giving the arrangement shown in Fig. 14.

Once the parts have been folded and compressed as in Fig. 14, it is impossible to open the loop formed by the loop member 39 without also opening the plates 36 and 37 and also without returning the stud 43 to its original position. The seal is made of a metal such as aluminum or one of its alloys that cannot be bent to the extent required to open the seal without tearing and which cannot be soldered. It is therefore impossible to open the seal without destroying it.

It will be apparent that the opening 44 of the seal of Fig. 10 may be positioned on the post 30 of the holder 25 to facilitate applying thumbprints on the seal as well as on the record form 26.

Through the above invention, a seal or tag is provided which cannot be opened without a visible and easily detectable break and one that could not occur except by forcible opening. The seal cannot be replaced by another similar seal without detection because it carries part of actual thumb prints that must match with official records which are positioned slightly differently for each installation.

Having described our invention, what we claim is:—

1. In combination, a holder, a record blank in the holder and having a cut away portion, a seal removably associated with the blank and means on the holder for positioning the seal in a predetermined relationship to the cut away portion of said blank.

2. In combination, a holder, a record blank engageable therewith and having an apertured record portion, a seal removably associated with the blank and the holder, and positioning means on the holder coacting with the seal.

3. In combination, a holder, a record blank positioned by the holder and having apertured or cut away record portions, an apertured seal, means secured to the holder engageable with the apertured seal and adapted to removably position it with respect to the record opening in said blank so as to facilitate applying an identifying mark partly on the blank and partly on the seal.

4. In combination, a holder adapted to position a record blank, an upstanding pin secured to said holder, a record blank perforated for engagement with said pin and having an apertured record portion and a seal having an apertured part engageable with said pin for removably positioning it relative to the record portion of said blank.

5. A seal comprising a loop member foldable between its ends and insertable through elements to be sealed, a mark receiving portion having a foldable neck portion intermediate its ends, parts of the seal being apertured at spaced points, a securing projection integral with the seal, the apertures and the projection being so located that, when the apertured parts are folded over into engagement with the projection, the latter lies intermediate the loop member and the mark receiving portion.

6. A seal comprising a metal sheet having mark receiving portions spaced by a neck portion, one of the mark receiving portions being apertured near its end and the other mark receiving portion having a fastening projection upstanding therefrom and adapted to project through said apertured portion when the sheet is folded at the neck portion and a loop member having an apertured end for engagement with said projection.

7. A seal comprising a metal sheet having a relatively wide portion constituting a mark receiving area, an integral narrower loop member extending outwardly from said portion and means for fastening the free end of the loop member to the opposite ends of the wide portion, after both the loop portion and the mark receiving portion have been folded over intermediate their ends, so that the areas between the bight of the loop and the bend in the mark receiving portion are separated by said fastening means.

In witness whereof, we have hereunto signed our names.

FREDERICK B. THOMSON.
SEVERN D. SPRONG.